3,197,484
2-HYDROPEROXIDES OF 2-ALKENYL DIOXOLANES AND META DIOXANES

Carol Kazuo Ikeda, Wallingford, Pa., assignor to E. I. du Pont de Nemours and Company, Wilmington, Del., a corporation of Delaware
No Drawing. Filed Jan. 12, 1962, Ser. No. 165,953
15 Claims. (Cl. 260—340.7)

This invention relates to a new class of 2-hydroperoxy compounds based on 2($\alpha$-alkenyl) cyclic acetals. It in particular relates to the 2-hydroperoxides of mono and bis 2-($\alpha$-alkenyl)-1,3-dioxolanes and -1,3-dioxanes having the general formula A—B or A—G—A in which A is a 2-($\alpha$-alkenyl)-1,3-cyclic acetal radical having the following structure:

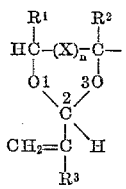

B is a monovalent alkyl radical substituted with at least one of —OH, —OR$_4$, —OOCR$_4$, —COOH or —COOR$_4$, where R$_4$ is an alkyl radical of 1 through 20 carbon atoms or an aromatic hydrocarbon radical, and G is —R$_5$—, —R$_5$OR$_5$—, —R$_5$OOCR$_6$COOR$_5$—,
—R$_5$COOR$_7$OOCR$_5$— or

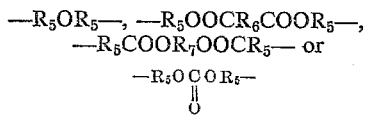

where

R$_5$ is an alkylene radical, R$_6$ is a divalent hydrocarbon radical and R$_7$ is an alkylene or polyalkyleneoxy radical.

The 1,3-cyclic acetal radical represented by A and shown above can be described as follows:

R$^1$ and R$^2$ are hydrogen or lower alkyl;
R$^3$ is hydrogen or methyl;
X is a divalent radical such as methylene or methylene substituted with at least one (a) C$_1$ to C$_3$ alkyl, (b) alkoxymethyl, (c) hydroxymethyl, (d) C$_1$ to C$_8$ acyloxymethyl radical, (e) chloromethyl, (f) hydroxy, (g) cyanoethoxymethyl, (h) allyloxy-methyl, or (i) an allylidenedioxydimethylene radical;
$n$ is an integer from 0 to 1.

In the foregoing structural formula the integer shown in the moiety

are given for purposes of nomenclature. Thus, the carbon atom shown is in the 2-position, and the 2-hydroperoxides of this invention have a hydroperoxy radical (—OOH) attached to such a number 2 carbon atom.

These hydroperoxides represent a new class of compounds combining both a reactive vinylidene group (i.e., having a terminal methylene) and a reactive hydroperoxy group. Such compounds are highly desirable for they can both actively initiate vinyl polymerization as well as provide a molecule that can take part therein as a vinyl monomer. Even more importantly, they are sufficiently stable that they can be stored, yet as well can—simply on heating—polymerize by themselves to yield useful polymers. They are prepared by air oxidation of the corresponding 2-($\alpha$-alkenyl) cyclic acetals under carefully controlled conditions.

The effect of gaseous oxygen on terminal methylene bearing compounds is widely variable. Frequently, with the acrylates and methacrylates, linear polymeric peroxy compounds are formed and normal vinyl polymerization is essentially inhibited. The attack of oxygen on saturated cyclic acetals is similarly known to produce linear dimeric peroxy compounds (Chemische Berichte, 91, 1936–41 (1958) #9) and the oxidation products of such acetals show no apparent polymerization.

According to this invention, relatively stable hydroperoxy compounds are formed from cyclic acetals having vinylidene groups in the 2 position, i.e., 2-($\alpha$-alkenyl) and preferably at least one oxygen containing group elsewhere on the ring. These hydroperoxides are useful as initiators for vinyl polymerizations in the 50° to 100° C. range and are effective with a wide range of vinyl monomers. In particular, these compounds are unique in their ability on decomposing therein to yield a highly active monomer that will copolymerize, avoiding the usual deleterious terminal residues. Alternatively, these compounds will homopolymerize to useful resins. In combination with siccative metals, they can serve as catalysts for air-drying acetal coating compositions. Further, they may be hydrolyzed in bulk to yield hydroxyalkyl esters of $\alpha,\beta$-unsaturated acids, such as acrylic, methacrylic, which are useful as resin-forming monomers, or as intermediates to solvents or other compounds via such well known reactions as ester interchange or hydrogenation.

Preparation of the hydroperoxides of this invention follow a general scheme in which the cyclic acetal is intimately exposed to gaseous oxygen at temperatures between 0–125° C. for about ½ to 10 hours, preferably but not necessarily, in the presence of a free radical source such as 0.01 to 1.0% by weight of azo-bis-isobutyronitrile, peroxides such as benzoyl-, tert butyl- or acetyl- or an actinic light or ionizing radiation source. Preferably temperatures from 65–90° C. are used with 0.1% catalyst in an inert solvent such as an ester, hydrocarbon, methylene chloride or carbon tetrachloride. Pressure may be used to increase the rate of oxygen takeup. Where ultraviolet irradiation is used, lower temperatures, 0–50° C. are preferred. The presence of siccative metals is to be avoided, e.g., Fe or Co.

Though rigorous isolation and purification is not a recommended practice with this type of compound, fractionation at reduced pressure may be carried out to purify the hydroperoxides. The more stable ones may also be purified by careful neutralization of a benzene solution of the product with ice cold 5% NaOH followed by (1) separation and regeneration with dry ice or CO$_2$ at low temperatures and then (2) extraction by pentane or ethyl ether. Gentle evaporation at room temperature of the latter yields the 2-hydroperoxide product.

The following examples illustrate the invention:

Example I

In a 500 ml. flask fitted with stirrer, metered oxygen inlet, thermometer, reflux condenser, are placed 50.0 grams (0.135 mol) of bis[(2-vinyl-1,3-dioxolane-4)-butyl] carbonate and 0.60 gram of azo-bis-isobutyronitrile. The flask is repeatedly evacuated and flushed with oxygen and then the contents are oxidized with dry oxygen gas by vigorous agitation for one hour at 80–86° C. 1410 ml. of oxygen is absorbed (equivalent to approximately 47% of O$_2$ required for formation of monohydroperoxide).

A sharp and intense absorption band at 3.0$\mu$ is observed in the infrared spectrum of the product which is due to the hydroperoxide OH. The presence of the hydroperoxide is confirmed by the fact that 2.0 grams sample of product +0.2 mil of Co++ butyl phthalate toluene solution (10 mg. Co++/ml.) produces an exotherm of 60° C. and leaves a solid resinous material. The product of this example is a mixture of mono and bis 2-hydroperoxides of bis[(2 - vinyl - 1,3-dioxolane-4)butyl]carbonate.

*Example II*

A 500 ml. flask equipped with a paddle stirrer, a condenser, a 1 liter gas burette, a thermometer and a heating mantle are charged with 50.0 grams (0.24 mol) of 4,9-divinylspiro-bi(m-dioxane) dissolved in 30 ml. of toluene and 0.5 gram of azo-bis-isobutyronitrile. The apparatus is flushed with pure oxygen by alternate filling and evacuation several times and then heating is started. At 90° C. oxygen absorption commences. After 1 hour at 80–90° C., a total of 1,590 ml. of oxygen is absorbed, equivalent to about 15% conversion to the bis-hydroperoxide. Hydroperoxy groups are found present by a pronounced infrared spectral band at $3.0\mu$ and by the fact that the product reacts exothermally with 0.01% cobalt to give a β-hydroxyacrylate (determined by infrared adsorption). The product of this example is a mixture of mono-4- and di-4,9-hydroperoxides of 4,9-divinylspiro-bi(m-dioxane) in which the 4 and 9 positions are structurally the equivalent of the 2 position of a 1,3-cyclic acetal. The hydroperoxide product of Example II is coated on a glass panel, flash air-dried to remove the solvent and then baked one minute at 225° C., produces a hard, colorless, clear, water and solvent-resistant coating.

*Example III*

In an apparatus similar to that of Example II, 70 grams of (2-vinyl-1,3-dioxolane-4)butyl benzoate are placed and treated in a similar manner with oxygen. Upon heating to 100° C., oxygen absorption starts and after 5 hours, 7.8 liters of oxygen are used and an amount equivalent to 40% conversion to 2-hydroperoxide is absorbed. The product reacts exothermally with 0.01% cobalt and absorbs strongly in the infrared at $3.0\mu$ showing the presence of the hydroperoxide group. The stability of the hydroperoxide is evidenced by the fact that after 1 month standing, the infrared spectrum of the product, particularly in the $3.0\mu$ region, remains substantially unchanged. Similar results are obtained with equimolar proportions of (2-isopropenyl-1,3-dioxolane-4)butyl acetate or benzoate.

*Example IV*

Using the technique and apparatus of Example I, 140 grams (0.8 mol) of 2-isopropenyl-5-methyl-5-hydroxymethyl-1,3-dioxane is oxidized to the equivalent 2-hydroperoxy-2-isopropenyl-5-methyl-5 - hydroxymethyl - 1,3-dioxane(HIPMD) at 60° C. for about 4 hours. About 8 grams of oxygen are absorbed. On fractionation and purification, a clear liquid showing a $3.0\mu$ I.R. band and exothermic reaction with Co++ results. An analogous hydroperoxide is obtained by using 2-vinyl-5,5-di(methoxymethyl)-1,3-dioxane as a starting material.

To a water emulsion of a 50/50 blend of methyl methacrylate and ethyl acrylate monomers with 1% sodium dodecyl benzene sulfonate are added 0.5% by weight of the above HIPMD hydroperoxide on the weight of monomers. Heating and stirring in a reflux container to 65° C. for two hours effects polymerization to a film-forming acrylic resin dispersion.

*Example V*

In an apparatus similar to Example II, 140 grams (0.4 mol) of the sebacic bis ester of 2-vinyl-5-methyl-5-hydroxymethyl-1,3-dioxane is treated as before described, with oxygen at 85–90° C. for about 3½ hours. About 8 liters of oxygen are absorbed, equivalent to about 45% conversion to the 2-hydroperoxide. A sharp and intense infrared spectral band at $3.0\mu$ and an exothermic reaction with .01% of a cobalt butyl phthalate solution to form a hard glassy resin verifies the presence of 2-hydroperoxy groups.

*Example VI*

Using the apparatus of Example II, 0.80 gram mols of 2-vinyl-4-(4-hydroxybutyl)-1,3-dioxolane are placed in the flask with 0.3 gram of azo-bis-isobutyronitrile catalyst and oxidized at 90° C. until 0.37 gram mols of oxygen are absorbed. A water-white liquid with a strong I.R. band at $3.0\mu$, a hydrogen peroxide titre of about 9% and an exothermic reaction with Co++ results and is identified as 2-hydroperoxy-2-vinyl-4(4-hydroxybutyl)-1,3-dioxolane.

*Example VII*

A mixture of 12.0 grams (0.053 mol) of 4,4'-ethylene bis(2-vinyl-1,3-dioxolane), the condensate of acrolein with 1,2,5,6-hexanetetrol and 0.12 gram of azo-bis-isobutyronitrile are oxidized with gaseous oxygen in a closed vessel fitted with a stirrer, heater, thermometer and gas burette to measure oxygen consumed. The oxygen is at atmospheric pressure at all times. Autoxidation starts at 80° C. and continues at a rate of 25 cc. O₂/min. The reaction is stopped after 980 ml. (about 0.044 gm. mol or about 83% of the oxygen required for formation of the mono-hydroperoxide) has been absorbed. The product is shown to be a dioxolane hydroperoxide by a very strong I.R. band at $3.0\mu$ and substantially no other changes in the spectrum over that of the starting material. The product reacts with Co++ (1 cc. of the product +0.2 cc. of cobalt butyl phthalate solution having 10 mg. Co++/ml.) to produce a spontaneous exotherm from 30° to 190° C. and a solid resinous product.

*Example VIII*

In the apparatus of Example II, 60.0 grams (0.126 mol) of the orthophthalate-bis-ester of (2-vinyl-1,3-dioxolane-4)btuanol plus 0.6 garm of azo-bis-isobutyronitrile are placed and treated at 75°–85° C. for 2 hours with oxygen as before described. It is found that 1350 ml. of oxygen is absorbed, equivalent to 24% of the bis-2-hydroperoxide of the diester. Films of the product cast on glass at 2 mils thick and baked at 135° C. x 30 minutes are tack free. Infrared spectral analysis and exothermic reaction with cobalt to form a clear resin establishes the presence of 2-hydroperoxy groups.

*Example IX*

A 500 ml. flask is equipped with a magnetic stirrer, a condenser, an inlet for a hypodermic syringe, an inlet for oxygen gas introduced through a volume-measuring instrument having a Dry Ice trap, and an exit for the gas similarly equipped. Then 0.44 gm. moles of 2-vinyl-4-methoxymethyl-1,3-dioxolane are placed in the flask, the temperature of the contents adjusted to 35° C. by an external impinging air stream and irradiation by an externally mounted, Hanovia Model S–10 quartz sun lamp begun. Oxygen flow is started immediately and as the reaction proceeds, samples are withdrawn from the flask periodically by the syringe and the volume of oxygen absorbed recorded. After 4 hours of reaction, a total of 3.15 liters of O₂ (RT and atmospheric pressure) is absorbed, an amount equivalent to 35% conversion of the dioxolane to the 2-hydroperoxide. The final sample on infrared examination shows development of a substantial band at $3.0\mu$ indicative of hydroperoxy groups without other noticeable changes in the spectra. Further evidence of hydroperoxy groups are shown by the exothermic reaction of the product with 0.01% cobalt butyl phthalate solution in toluene which if kept below about 40° C. by cooling yields 2-hydroxy-3-methoxypropyl acrylate.

*Example X*

In a 500 ml. flask fitted with stirrer, oxygen inlet, thermometer and reflux condenser are placed 105 grams of 2-vinyl-5,5-di(chloromethyl)-1,3-dioxane (0.5 mol). After evacuation and flushing several times with oxygen, the contents are heated to about 60–70° C. Dry oxygen (6.3 l.) is bubbled through the contents and at the end of 1½ hours, 0.28 gram mol is absorbed. The infrared spectrum of the material shows the generation of hydroperoxy groups by a significant band at $3.0\mu$. The contents are vacuum stripped to give 63 grams (0.62 mol) of unreacted dioxane and a residue of about 47 grams containing the hydroperoxide. The residue is inhibited with 0.5 gram of hydroquinone and fractionated to give 26.3 grams (0.13 mol) of the 2-hydroperoxy-2-vinyl-5,5-di(chloromethyl)-1,3-dioxane.

In a separate container 5 grams of purified styrene monomer are mixed with one drop (about 0.05 gram) of the hydroperoxide prepared above. On heating gently, the styrene is polymerized to a clear resin in about 20 minutes' time.

Example XI

Two gram moles of 2-vinyl-4-hydroxymethyl-1,3-dioxolane, formed by the condensation of glycerine and acrolein, are transesterified in a conventional manner with 1.2 gram mols of diethyl maleate in 50 cc. of toluene by (a) placing the above ingredients in a stirred, heated vessel equipped for reflux and distillation and drying by heating to strip off the toluene/water azeotrope and then, (b) adding a gram of sodium methoxide and heating at 80–90° C. for about three hours, distilling off the formed ethyl alcohol, and then (c) by reducing the pressure to about 2 mm. Hg, stripping off the residual diethyl maleate at about 80° C. The vessel is then flushed with nitrogen, sealed and connected to a metered oxygen supply. By evacuation of the vessel, a metered amount of dry oxygen is then allowed to enter and heating and stirring are continued until about 13 liters of oxygen have been absorbed over a period of about 4 hours at 80–90° C.

The clear, viscous contents of the vessel are cooled and on infrared examination show among other bands, an intense band at about $3.0\mu$ due to hydroperoxy groups. The product is identified as the 2-hydroperoxide of the maleate bis ester of (2-vinyl-1,3-dioxolane-4)methanol. Addition of a drop of cobalt butyl phthalate solution and gentle warming produces a rapid exotherm and generation of a hard resinous foamed product.

Example XII

Using a procedure and equipment similar to Example XI, the itaconate bis ester of (2-isopropenyl-1,3-dioxolane-4)butanol is prepared by esterification of dimethyl itaconate with (2-isopropenyl-1,3-dioxolane-4)butanol, a condensation reaction product of 1,2,6-hexanetriol and methacrolein.

A 0.5 gram mol of the bis ester is placed in a 500 ml. flask, the flask evacuated and a metered amount of oxygen allowed to enter the vessel while stirring vigorously and heating the contents to about 60°–70° C. Over a period of 10 hours about 3 liters of oxygen is absorbed and the 2-hydroperoxide of the itaconate bis ester of (2-isopropenyl-1,3-dioxolane-4)butanol is formed.

Hydroperoxy groups are found present by infrared spectral analysis. Addition of a small amount of soluble cobalt compound produces a violent exotherm with rapid formation of a hard clear resinous product. This itaconate bis ester also air dries rapidly when coated on a metal panel pretreated with a solution of an ester soluble cobalt compound.

Example XIII

Using a process such as disclosed in U.S. Patent 3,014,-924, acrolein and the ethyl ester of 9,10-dihydroxy stearic acid are condensed and the reaction product purified to yield 2-vinyl-4-octyl-5-carbethoxyheptyl-1,3-dioxolane.

A 0.5 gram molar quantity of the above product was then placed in a 500 ml. flask fitted with heater, stirrer, reflux column and oxygen inlet and the contents slowly oxidized with vigorous agitation at 65–70° C. for 4 hours by passing in dry oxygen. Approximately 5 liters of oxygen are absorbed.

A pale yellow viscous product remains, having a sharp and intense infrared band at $3.0\mu$ and is determined to be the 2-hydroperoxide of 2-vinyl-4-octyl-5-carbethoxyheptyl-1,3-dioxolane.

Example XIV

In a 500 ml. vessel fitted with stirrer, heater, reflux and distilling column are placed 0.5 gram mol of 2-vinyl-4-hydroxymethyl-1,3-dioxolane, 0.75 gram mole of 3,4-dihydropyran and about 0.2 gram of oxalic acid. The contents are heated to reflux for about 3 hours and then fractionated at 120°–127° C. and 1 mm. Hg pressure to obtain 2-tetrahydropyranyl ether of (2-vinyl-1,3-dioxolane-4)methanol.

A 0.25 gram mole of the resulting ether is placed in a flask inlet and evacuated. Dry metered oxygen is pulled into the vessel and the contents reheated and stirred to about 90° C. for about 4 hours until 3.0 liters of oxygen have been absorbed.

A clear viscous liquid results identified as the 2-hydroperoxide of the above tetrahydropyran-2-yl (2-vinyl-1,3-dioxolane-4)methyl ether, i.e., 2-vinyl-4-(tetrahydropyran-2-yl-oxymethyl)-1,3-dioxolane.

Example XV

Using the method disclosed in U.S. Patent 3,014,924, a 2-vinyl-5,5'-di(allyloxymethyl)-1,3-dioxane is prepared from the diallyl ether of pentaerythritol and acrolein.

The 0.5 gm. mols of the above dioxane then is treated with dry oxygen using equipment and procedure similar to that of Example XIII. After heating between 60–70° C. for about 7 hours, about 12 liters of oxygen are absorbed. The resulting yellow viscous product is identified as the 2-hydroperoxide of 2-vinyl-5,5'-di(allyloxymethyl)-1,3-dioxane. It shows an intense band at $3.0\mu$ by infrared and a rapid exotherm with a small amount of soluble cobalt to yield a hard resinous solid.

Example XVI

Equimolar quantites of acrylonitrile and 2-vinyl-5-hydroxymethyl-1,3-dioxane are condensed by refluxing for 4 hours at 65° C. in a heated, stirred vessel using 0.1% by weight of the reactants of a catalyst "Triton" B (a proprietary product of Rohm & Haas Company comprising a 35% solution in methanol of benzyl trimethyl ammonium hydroxide). The contents are fractionated at reduced pressure to obtain 2-vinyl-5-($\beta$-cyanoethoxymethyl)-1,3-dioxane.

Using the equipment and procedure of Example XIII, the above dioxane is treated with dry oxygen at 85° C. for 4 hours to yield the 2-hydroperoxide of 2-vinyl-5-($\beta$-cyanoethoxymethyl)-1,3-dioxane.

Example XVII

Various 2-hydroperoxy cyclic acetal carboxylic acid esters of hydroxy compounds can be prepared as follows:

Using a stepwise reaction (2-vinyl-1,3-dioxolane-4)butyric acid is first prepared:

(a) 27.2 parts of 5-hexenenitrile, prepared from methacrolein and propylene according to the process described in U.S. 2,641,607, are mixed with 100 parts of formic acid in a stirred reactor fitted for reflux and heated at 40° C. Over a 30-minute period, 33 parts of 35% hydrogen peroxide is added and allowed to react for 1 hour at 40° C. and then for 3 hours at 90–95° C. The reaction is (then preferably fractionally distilled, collecting the cut at 145°–146° C. at 1–2 mm. Hg and) then hydrolyzed by dissolving in 240 parts methanol containing 1 part of sodium methoxide and refluxing for about 1 hour. After stripping off the methanol, the product 5,6-dihydroxyhexanenitrile is fractionally distilled at 158–162° C. at 4 mm. Hg.

(b) Forty-six parts of the above-purified nitrile are mixed with 48 parts of acrolein diethyl acetal, 140 parts of toluene and 0.4 part oxalic acid in a reflux vessel and the toluene-ethanol azeotrope distilled off between 66°–89° C. The pressure is then reduced to 50 mm. to remove any residual toluene and the product cyclic acetal fractionally distilled at 110°–120° C. at 2–3 mm. Hg.

(c) The 2-vinyl-1,3-dioxolane-4-butyronitrile formed in the above step is combined with that of other duplicate runs and 80 parts are refluxed for 2 hours in 200 parts of 20% aqueous NaOH solution. The solution is then cooled and maintained at about 25° C. while stirring and neutralizing slowly to a pH of 7 with 42% sulfuric acid. The product is thereafter removed by extraction four times with 120 parts of diethyl ether. The ether is stripped off and the product (2-vinyl-1,3-dioxolane-4) butyric acid is fractionally distilled at 155°–160° C. at 4–5 mm. Hg.

The acid can then be converted to the methyl ester by reacting 70 parts with 35 parts of diazomethane dissolved in 300 parts of diethyl ether at 25° C. for two hours. After removal of the ether by gentle warming on a steam bath, 75 grams of the 2-vinyl-1,3-dioxolane-4-butyrate methyl ester is treated with oxygen in the manner of Example I to form the methyl ester of (2-hydroperoxy-2-vinyl-1,3-dioxolane-4) butyric acid.

*Example XVIII*

Using the equipment and process of Example XI, 2 gram mols of the methyl ester of 2-vinyl-1,3-dioxolane-4-butyric acid prepared as in Example XVI are transesterified with 1 gram mol of diethylene glycol in 50 cc. of toluene as follows: The toluene/water azeotrope is first removed, then a gram of sodium methoxide is added and transesterification carried out for about 3 hours with removal of the toluene/methanol azeotrope. The pressure is reduced, the residual toluene stripped off and then a metered oxygen supply connected and oxygen allowed to be absorbed while heating at 70–80° C. and stirring vigorously for about 4 hours. The 2-hydroperoxide of diethylene glycol bis ester of (2-vinyl-1,3-dioxolane-4) butyric acid is formed. Addition of a small amount of soluble cobalt ion produces a rapid exotherm and a solid resinous product.

Replacement of glycerine for the diethylene glycol and using a 3× molar equivalent amount of the methyl ester of the substituted butyric acid in the above procedure, a 2-hydroperoxide of the glycerine tris ester of 2-vinyl-1,3-dioxolane-4-butyric acid can be prepared.

In a related fashion, the 1,3 cyclic acetal alkanoic acids also can be esterified with 1,3 cyclic acetal alkanols and the hydroperoxides prepared therefrom. For example, in Example XV, the diethylene glycol can be replaced by a 2× molar equivalent amount of (2-vinyl-1,3-dioxolane-4)butanol to produce 2-hydroperoxide of (2-vinyl-1,3-dioxolane-4)butyl (2-vinyl-1,3-dioxolane-4) butyrate.

Using the above same general directions, other compounds within the scope of this invention can be made. For example, alkyl substituents in the ring positions include those whose $R^1$ and $R^2$ groups are methyl, ethyl, propyl, butyl, amyl, hexyl, heptyl and octyl. The substituted monovalent alkyl groups that constitute the B radical classification include hydroxymethyl, hydroxyethyl, hydroxypropyl, hydroxybutyl, hydroxyamyl and hydroxyhexyl. Alkoxy groups that in turn can be used to replace the hydroxy group of the above radicals include methoxy, ethoxy, propoxy and butoxy. The hydroxy group of the above radicals can be replaced by the analogous acyloxy group of monocarboxylic acids to yield acetates, propionates, butyrates, caproates, caprylates, pelargonates, caprates, palmitates, stearates, benzoates, toluates, etc., of the corresponding hydroxyalkyl substituted 1,3-cyclic acetal. Other B groups include carboxyethyl, carboxypropyl, carboxybutyl and carboxyheptyl. The carboxy radicals of these latter groups can, in turn, be esterified with mono and polyhydroxy compounds, such as ethanol, butanol, glycol, glycerine, cyclic acetal alkanols, etc.

Representative derivatives of the above compounds are the 2-vinyl-2-hydroperoxy-(Z)-1,3-dioxolanes in which Z is:

4-methyl-4-(2-hydroxyethyl)-
4-ethyl-5-(4-hydrovybutyl)-
4-methoxymethyl-
4-methyl-5-(4-methoxybutyl)-
4,5-dimethyl-4-(2-hydroxyethyl)-
4,4-diethyl-5-(3-hydroxypropyl)-
4-octyl-5-(7-carboxyheptyl)-
4-(2-hydroxyethyl)-
4-(4-hydroxybutyl)-
4-(4-carbobutoxybutyl)-
4-(carbomethoxypropyl)-

Similar derivatives can be made when the vinyl group is replaced by an isopropenyl group.

Analogues of the related 1,3-dioxanes can similarly be prepared. Thus, some representative substituted 2-hydroperoxy-2-vinyl-(Z)-1,3-dioxanes include those where (Z)- is:

4-methylol-
4-butyl-5-hydroxyethyl-
5-methylol-
5-(3-hydroxypropyl)-
4,6-dimethyl-5-hydroxymethyl-
4-(4-hydroxybutyl)-5,5-dimethyl-
5,5-di(methoxymethyl)-
5,5-dimethylol-
5-ethyl-5-hydroxymethyl-
5-methyl-5-benzoyloxymethyl-
5-ethyl-5-acetyloxymethyl- As before shown, the 2-vinyl group may be replaced by an isopropenyl group and the hydroxy groups can be replaced by the previously listed ester groups of monocarboxylic acids. Further, the 5 position can be substituted by the divalent residue resulting from removal of a methylene group from a second dioxane ring (the allylidene dioxydimethylene group) thus forming a spirobis-m-dioxane, e.g., as shown in Example II.

The divalent radicals of the G classification yielding bis compounds include methylene, ethylene, propylene, butylene, oxydimethylene, oxydiethylene, oxydipropylene, oxydibutylene and higher homologues. Thus, representative compounds of the A—G—A category which can be converted into the analogous 2-hydroperoxides by the action of oxygen include:

4,4'-oxydimethylene-bis-(2-vinyl-1,3-dioxolane)
4,4'-oxydimethylene-bis-(2-isopropenyl-1,3-dioxolane)
4,4'-ethylene-bis-(2-vinyl-1,3-dioxolane)
4,4'-oxydiethylene-bis-(2-vinyl-1,3-dioxolane)
4,4'-butylene-bis-(2-isopropenyl-1,3-dioxolane)

In an analogous fashion 2-hydroperoxides can be prepared by treatment with oxygen of the hydrocarboxy bis compounds formed by esterifying either (1) dicarboxylic acids with 1,3 cyclic acetal alkanols, or (2) polyhydroxy compounds with 1,3 cyclic acetal alkanoic acids. Thus, G classification radicals of the first category which have the formula

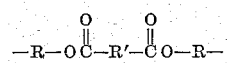

(R being a divalent alkylene and R' a divalent hydrocarbon radical) i.e., the hydrocarbdioyldioxy dialkylene radicals can be:

(oxalyldioxy)dialkylene
(succinyldioxy)dialkylene
(adipolydioxy)dialkylene (suberoyldioxy)dialkylene
(sebacoyldioxy)dialkylene
(phthaloyldioxy)dialkylene
(itaconoyldioxy)dialkylene
(maleoyldioxy)dialkylene
(fumaroyldioxy)dialkylene and thus yield, for example, an A—G—A type compound (phthaloyldioxy)dibutylene bis-(2-vinyl-1,3-dioxolane-4). An alternative but simpler type of terminology for these compounds and preferred in this specification would describe this compound as the phthalate bis ester of (2-vinyl-1,3-dioxolane-4)butanol.

Thus, phthalates, maleates, itaconates, adipates, sebacates and carbonates, etc., for example, can be prepared of these and other such 1,3-cyclic acetals as:

(2-vinyl-1,3-dioxolane-4)methanol
(2-vinyl-1,3-dioxolane-4)ethanol
(2-vinyl-1,3-dioxolane-4)propanol
(2-vinyl-1,3-dioxolane-4)butanol
(2-methyl-4-(2-vinyl-4-methyl-1,3-dioxolan-4-yl)butanol
(2-vinyl-1,3-dioxane-5)methanol
(2-vinyl-1,3-dioxane-5)ethanol
(2-vinyl-1,3-dioxane-5)propanol
(2-vinyl-5-methyl-1,3-dioxane-5)methanol
(2-vinyl-5-methoxymethyl-1,3-dioxane-5)methanol The 2-isopropenyl homologues of the above 2-vinyl compounds can also be used.

Similarly, G radicals of the secondary category above having the formula

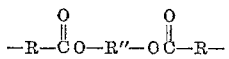

the polymethyleneoxy dicarbodialkylene radical can be described. In this R is a divalent alkylene radical having 1 to 8 carbon atoms and preferably 1 to 4, such as methylene, ethylene, isopropylidene, propylene, and butylene. The R″ is a divalent radical derived by removing at least two terminal —OH groups from a polyol and can be alkylene groups, such as already listed above, or polymethyleneoxy groups, such as oxydiethylene oxy bis (trimethylene), oxydiisopropylene, oxy bis (tetramethylene) and the analogous radicals derived from higher polymethylene ether glycols—wherein there are multiple intralinear polymethylene and oxy groups. Thus, hydroperoxides of bis-1,3-cyclic acetals having central polymethyleneoxy dicarbodialkylene groups are those derived by the oxidation of the esters of polyhydroxy compounds (such as glycol, diethylene glycol, glycerine, diglycerine, propanediol, butanediol, pentanediol, hexanetriol, etc.) with 1,3-cyclic acetal substituted aliphatic carboxylic acids as shown by the 2-hydroperoxides of the following compounds:

ethylene bis [(2-vinyl-1,3-dioxolane-4)butanoate]
ethylene bis [(2-vinyl-1,3-dioxolane-4)propanoate]
oxydiethylene bis [(2-vinyl-1,3-dioxolane-4)ethanoate]
tetramethylene bis [(2-vinyl-4-methyl-1,3-dioxolane-4)butanoate]
oxydiisopropylene bis [(2-vinyl-4-methyl-1,3-dioxolane-4)ethanoate]
propane-1,2,3-tris-[(2-vinyl-1,3-dioxolane-4)butanoate]

The 2-isopropenyl analogues can also be readily prepared as well as the 1,3-dioxan-4-yl and 1,3-dioxan-5-yl analogues of the above compounds. Hydroperoxides of the related esters of other glycols, such as the polyethylene glycols, polypropylene glycols and polytetramethylene glycols can be made.

The 2-(α-alkenyl) cyclic acetals used in making the products of this invention are a known class of compounds prepared by the general reaction of acrolein or methacrolein with polyols under mild conditions. Representative polyols are glycerine, diglycerine, glycerine monomethyl ether, 4-methoxy-pentanediol-3,5, pentane-1,3,5-triol, hexan-1,2,6-triol, 1,2,5,6-hexanetetrol, sorbitol, pentaerythritol, dimethyl ether of pentaerythritol, trimethylolmethane, trimethylolpropane, trimethylolethane, and the mono esters of these compounds with monocarboxylic acids. 9,10-dihydroxy stearic acid is also useful.

In general, the greater activity, ease of preparation and purification of the lower homologues where $R^1$ and $R^2$ are hydrogen or methyl makes these the preferred structures derived from the monocyclic acetals. For the bis compounds, the phthalates, itaconates, sebacates and maleates of the 1,3-cyclic acetal substituted $C_1$ to $C_4$ alkanols are preferred for their more desirable resin-forming properties.

I claim:

1. (2-hydroperoxy-2-vinyl-1,3-dioxolane-4)butyl benzoate.
2. (2-hydroperoxy-2-isopropenyl-1,3-dioxolane-4)butyl acetate.
3. 2-hydroperoxy-2-isopropenyl - 5 - methyl-5-hydroxymethyl-1,3-dioxane.
4. The 2-hydroperoxide of the sebacic-bis-ester of 2-vinyl-5-methyl-5-hydroxymethyl-1,3-dioxane.
5. The 2-hydroperoxide of the phthalate-bis-ester of (2-vinyl-1,3-dioxolane-4)butanol.
6. The 2-hydroperoxide of 4,9-divinylspiro-bis (m-dioxane).
7. The 2-hydroperoxide of 4,4′ethylene-bis-(2-vinyl-1,3-dioxolane).
8. The 2-hydroperoxide of bis [(2-vinyl-1,3-dioxolane-4) butyl]carbonate.
9. The 2-hydroperoxide of the itaconate bis-ester of (2-isopropenyl-4-methyl-1,3-dioxolane-4)butanol.
10. The 2-hydroperoxide of the phthalate bis-ester of (2-isopropenyl-1,3-dioxane-4)butanol.
11. The 2-hydroperoxide of the maleate bis ester of (2-vinyl-1,3-dioxolane-4)methanol.
12. The 2-hydroperoxide of tetrahydropyran-2-yl (2-vinyl-1,3-dioxolane-4)methyl ether.
13. Methyl (2-hydroperoxy-2-vinyl - 1,3-dioxolane-4)-butyrate.
14. The 2-hydroperoxide of (2-vinyl-1,3-dioxolane-4)-butyl (2-vinyl-1,3-dioxolane-4)butyrate.
15. A 2-hydroperoxide of a compound having a structure selected from the group consisting of A—B and A—G—A wherein
A is a radical of the structure

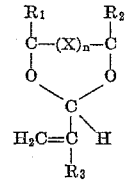

wherein
$R_1$ and $R_2$ are selected from the group consisting of hydrogen and alkyl of 1 through 8 carbon atoms,
$R_3$ is selected from the group consisting of hydrogen and methyl; and
X is a radical selected from the group consisting of methylene and methylene substituted with at least one radical selected from the group consisting of
alkyl of 1 through 3 carbon atoms,
alkoxymethyl,
hydroxymethyl,
acyloxymethyl of 1 through 8 carbon atoms,
chloromethyl,
hydroxy,
cyanoethoxymethyl,
allyloxymethyl, and
allylidenedioxydimethylene, B is a monovalent alkyl radical of 1 through 6 carbon atoms substituted with at least one radical selected from the group consisting of
—OH,
—COOH
—OR$_4$,
—OOCR$_4$, and
—COOR$_4$
where R$_4$ is a radical selected from the group consisting of alkyl of 1 through 20 carbon atoms, benzyl and tolyl, and G is selected from the group consisting of
—R$_5$—
—R$_5$OR$_5$—
—R$_5$OOCR$_6$COOR$_5$—
—R$_5$COOR$_7$OOCR$_5$—, and $$-R_5 O \overset{\overset{\displaystyle O}{\|}}{C} R_5-$$

where

R$_5$ is an alkylene radical of 1 through 4 carbon atoms;
R$_6$ is a divalent hydrocarbon radical of 1 through 8 carbon atoms; and
R$_7$ is a radical selected from the group consisting of alkylene of 1 through 8 carbon atoms and polyalkyleneoxy of 1 through 6 carbon atoms; and
$n$ is a number 0 to 1.

References Cited by the Examiner

UNITED STATES PATENTS

| | | | |
|---|---|---|---|
| 3,010,923 | 11/61 | Ikeda | 260—340.9 |
| 3,054,803 | 9/62 | Robeson et al. | 260—340.7 |
| 3,130,201 | 4/64 | Rieche et al. | 260—340.9 |

NICHOLAS S. RIZZO, *Primary Examiner.*

DUVAL T. McCUTCHEN, WALTER A MODANCE, *Examiners.*